United States Patent [19]

Collins et al.

[11] 4,235,455
[45] Nov. 25, 1980

[54] VEHICLE SEAT BELT RETRACTOR MECHANISM

[75] Inventors: Alford F. Collins, Westland; Bill A. Dixon, Farmington Hills, both of Mich.

[73] Assignee: Ford Motor Company, Dearborn, Mich.

[21] Appl. No.: 29,410

[22] Filed: Apr. 12, 1979

[51] Int. Cl.³ .............................................. B60R 21/10
[52] U.S. Cl. ........................... 280/803; 242/107.4 A; 280/806
[58] Field of Search ............... 280/803, 806, 808, 802; 242/107.4 A, 107.4 B

[56] References Cited

U.S. PATENT DOCUMENTS

| | | | |
|---|---|---|---|
| 3,866,944 | 2/1975 | Takahashi | 280/803 |
| 4,007,802 | 2/1977 | deRosa | 280/803 |
| 4,040,645 | 8/1977 | Giffen et al. | 280/803 |
| 4,181,326 | 1/1980 | Hollowell et al. | 280/803 |

FOREIGN PATENT DOCUMENTS 2658747  6/1978  Fed. Rep. of Germany ........... 280/206

*Primary Examiner*—John J. Love
*Assistant Examiner*—Donn McGiehan
*Attorney, Agent, or Firm*—John J. Roethel; Clifford L. Sadler

[57] ABSTRACT

A seat belt inhibitor system is designed to prevent door mounted inertial seat belt retractor 14 from locking the seat belt webbing 13 whenever the door is opened. The retractor pendulum 31, sensitive to acceleration, moves the locking bar 28 upward locking the retractor and prevents the belt webbing from paying out. An electromagnet 36, when energized, attracts a leaf spring 37 extending from the locking bar inhibiting movement of the latter. System inhibiting is initiated by closing either a door latch switch 42 or a door release handle switch 41. At low accelerations (occurring while the door is being opened), the locking bar 28 is restrained by the electromagnet 36 through the leaf spring 37. If the system should fail such that the electromagnet was energized while the door is closed, high acceleration of the pendulum would force the locking bar up, locking the retractor. Deenergizing occurs normally whenever the door is closed.

4 Claims, 3 Drawing Figures

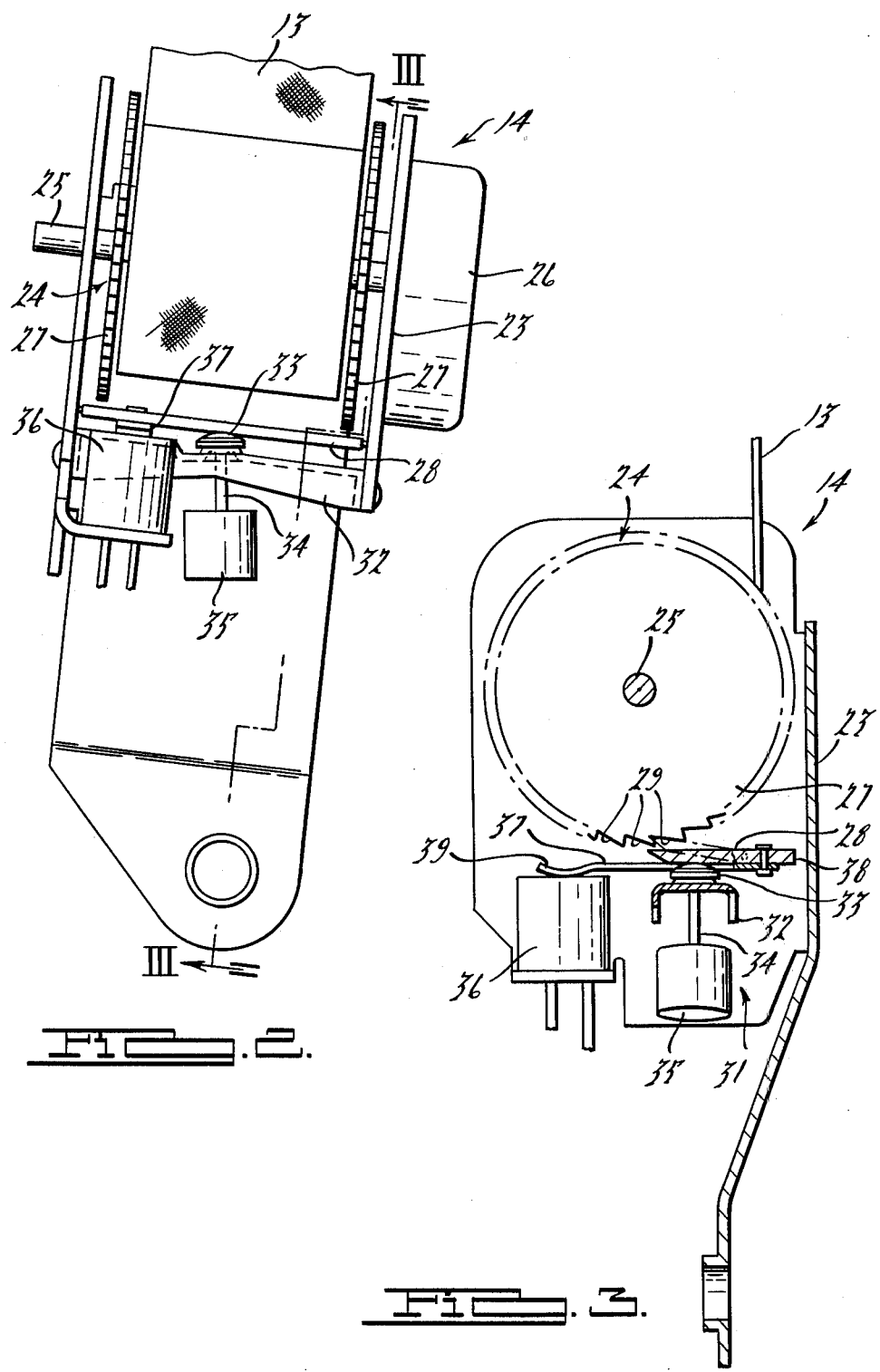

VEHICLE SEAT BELT RETRACTOR MECHANISM

BACKGROUND OF THE INVENTION

Currently, there is interest in equipping passenger vehicles with passive seat belt systems having an upper torso restraint belt, more commonly known as a shoulder harness, that automatically extends itself across the upper torso of a front seat occupant upon the closing of the vehicle door adjacent to the seating position. In one known system, one end of the belt is anchored to an upper portion of the door frame, and the other end of the belt is anchored to a spring-loaded reel of a retractor mechanism mounted on the inboard side of the seating position. The retractor mechanism in this system permits the belt to protract from the retractor mechanism upon the opening of the door, and to retract upon the closing of the door.

The retractor mechanism preferably is of the vehicle sensitive inertia type. In this type of retractor mechanism, an inertia sensor comprising a pendulum device is engageable with a reel locking bar to drive the latter into reel latching engagement upon rapid acceleration or deceleration of the vehicle, as might occur during an accident, to prevent loss of the seat occupant restraint function of the shoulder harness.

One disadvantage of having the retractor mechanism on the inboard side of the seating position is that the mechanism excessively protrudes into the passenger compartment space. A second disadvantage, as discussed in U.S. Pat. No. 4,040,645 issued Aug. 9, 1977 to W. M. Giffen for a "Seat Belt Apparatus," is that the webbing of the shoulder harness is frictionally dragged across the seat occupant's clothing as the door is opened and closed. The alternative is to reverse the belt anchorage points by mounting the retractor mechanism within available space between the inner and outer door panels to receive the outer end of the torso belt and by connecting the inner end of the belt to an anchor device at the inboard side of the seating position. It has been found, however, that the rapid swinging movement of the door, as it is swung from or to a closed position, causes the inertia sensor to lock the reel. Without the necessary full protraction of the belt the door would not open and the seat occupant, undesirably, would be restrained against egress from the vehicle. Limitations on the retraction of the belt during closing movement of the door could result in a tangled or jammed belt, or an improper fit of the belt about the seat occupant's torso.

U.S. Pat. No. 3,866,944 issued Feb. 18, 1975 to K. Takahashi for a "Locking Device for Seat Belt for Vehicles," and the aforementioned U.S. Pat. No. 4,040,645, both recognize the desirability of relating the operation of the seat belt retractor mechanism to closure and opening of the vehicle door. The '944 patent discloses a number of ways of accomplishing the desired result, some of which are relatively complex mechanical linkage systems and others of which combine both electrical and mechanical operations for selectively controlling the unlocking of the retractor. The '645 patent discloses a much simpler system that uses a pendulum device operable in a conventional manner for moving a locking bar into ratchet plate engagement to lock a retractor reel against permitting belt protraction. A lever system responsive to the position of the vehicle door operates to block movement of the locking bar by the pendulum device when the vehicle door is open. The disadvantage of a lever system is that it is not fail safe and may jam in a manner to render the pendulum device inoperative to cause movement of the locking bar into ratchet plate engagement when needed.

The present invention embodies a simple mechanism to accomplish the desired function with greater assurance that the mechanism will be operative.

SUMMARY OF THE INVENTION

The present invention relates to a vehicle seat belt retractor mechanism having a seat belt reel rotatably mounted on a shaft journalled in a support frame. The reel has at least at one of its ends a circular ratchet plate. A locking bar means is pivotally mounted on a support frame for movement into ratchet plate engagement to hold the reel against rotation in seat belt protraction direction. An inertia sensor means comprising a pendulum device is engageable with the locking bar means for driving the latter into ratchet plate engagement under adverse acceleration or deceleration conditions of the vehicle.

The improved construction and arrangement embodying the present invention comprises an electromagnet means contiguous to the locking bar means and energizeable to exert a holding force resisting movement of the latter into ratchet plate engagement by the pendulum device until the acceleration and deceleration forces acting on the pendulum device exceed a predetermined magnitude. An override means is interposed between the electromagnet means and the locking bar permitting the pendulum device to drive the locking bar into ratchet plate engagement upon the acceleration or deceleration forces exceeding the predetermined magnitude. A source of current is provided for energizing the electromagnet means. A switch means responsive to a predetermined condition of a vehicle component, such as a vehicle door, controls the application of current to the electromagnet means.

DESCRIPTION OF THE DRAWINGS

The advantages and features of the present invention will become more apparent as the description proceeds, reference being had to the accompanying drawings.

FIG. 2 is an elevation of the retractor mechanism as modified in accordance with the present invention; and FIG. 3 is a section view taken substantially on the line 3—3 of FIG. 2.

DETAILED DESCRIPTION OF THE INVENTION

Figure 1:
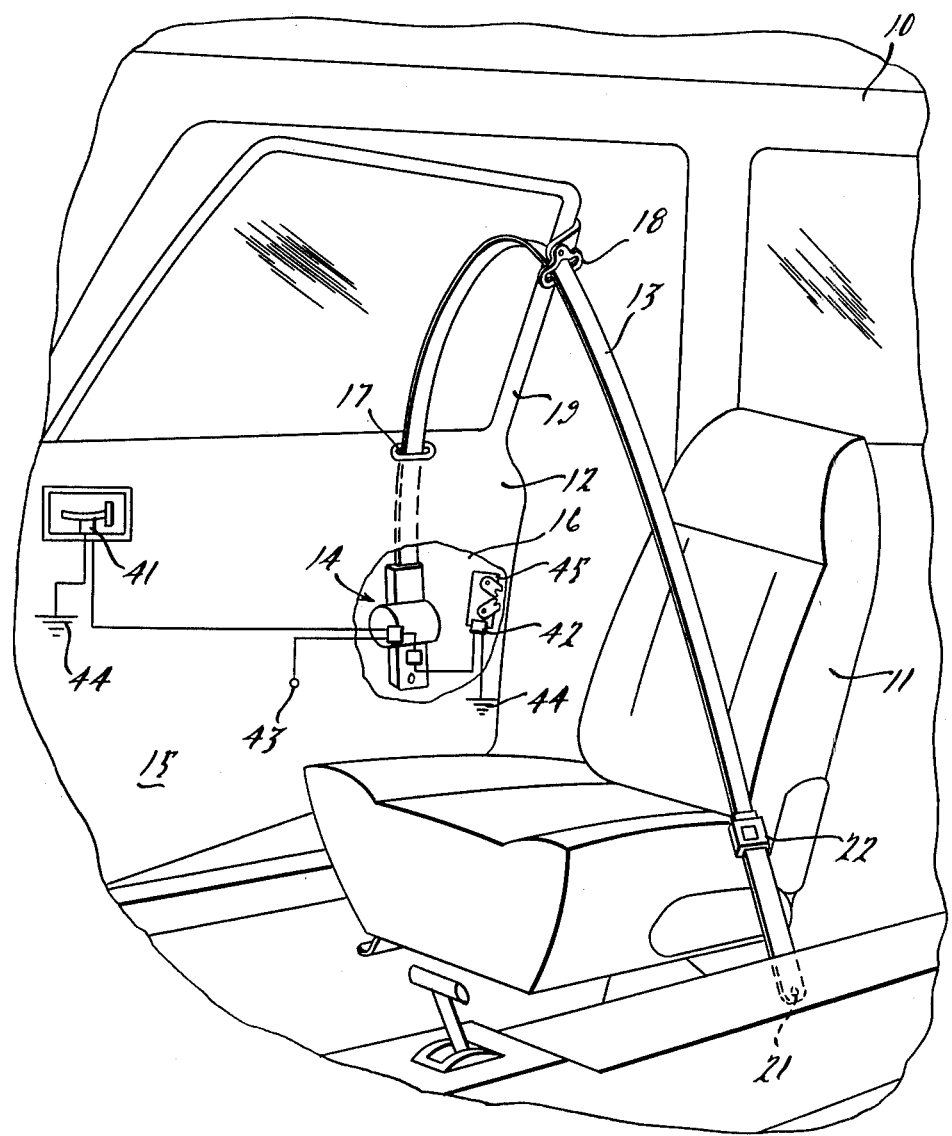
FIG. 1 is a perspective view of a portion of the interior of a vehicle body illustrating a seat belt system for restraining a seat occupant in a seating position.

Referring now to the drawings, FIG. 1 illustrates the interior of a vehicle body 10 having a passenger seating position represented by a vehicle seat 11 adjacent a door 12. Shown in proximity to the vehicle seat 11, is a two-point passive seat belt 13. The seat belt 13 extends from a retractor mechanism, generally designated 14, supported between the inner panel 15 and outer panel 16 of the door 12. The belt 13 extends upwardly from the retractor mechanism 14 through an opening 17 at the window opening edge of the panel 15 and then further upwardly to a "D" ring 18 anchored on a vertical frame member 19 of the door. From the "D" ring, the belt 13 extends downwardly across the seat 11 to an anchor 21 at the inboard side of the seat 11. Although a buckle device 22 is shown near the lower inboard end of the belt 13, this primarily is intended to function as an emergency release device. As known in the art, the two-point passive seat belt is intended to automatically embrace a seat occupant as the vehicle door 12 is swung to a closed position and to automatically release the seat occupant as the door is swung to an opened position.

The retractor mechanism 14, as shown in greater detail in FIGS. 2 and 3, is constructed and arranged to provide for free protraction of the seat belt to permit free swinging movement of the door 12 away from the seat 11 and, conversely, to provide for free retraction as the required belt length shortens as the door is moved to a closed position.

The retractor mechanism 14 preferably is of the type known as a vehicle sensitive inertia retractor, see FIGS. 2 and 3. Basically, it comprises a support frame 23 having a seat belt reel 24 rotatably journalled in the frame on a shaft 25. The shaft 25 is coupled to a clock spring concealed within a housing 26. As is well known in mechanisms of this type, the function of the clock spring is to urge the reel 24 in belt retraction or rewinding direction following protraction of the belt. The reel 24 carries, at either or both ends, a circular ratchet plate 27.

A locking bar or pawl 28 extends across the width of the support frame 23 in substantially parallel relation to the reel shaft 25. The locking bar 28 is pivotal into and out of engagement with the ratchet teeth 29 on the ratchet plate 27. When in engagement with the ratchet plate, the locking bar 28 prevents rotation of the reel 24 in a direction permitting protraction of the belt 13. In a vehicle sensitive inertia retractor, the locking bar 28 normally is not engaged with the ratchet plate 27, and the belt 13 is freely protractable or retractable as is required to accommodate swinging movement of the door in closure or opening directions.

The locking bar 28 is movable into ratchet plate engagement by an inertia sensor that senses violent acceleration or deceleration changes in the motion of the vehicle, as may occur under accident conditions.

The inertia sensor commonly comprises a pendulum 31 supported on a bridge structure 32 carried on the frame 23 of the retractor mechanism. The pendulum 31 has a cap 33, a stem 34 and a mass or weight 35. When the vehicle is suddenly accelerated or decelerated, the inertia of the pendulum weight or mass 35 causes the pendulum to tilt. This results in the cap 33 being eccentrically tilted about an edge on the upper surface of the bridge. The diametrically opposite edge raises upwardly beneath the locking bar 28 and drives the latter from the solid outline position to the dotted outline position, as shown in FIG. 4. In the dotted outline position, the locking bar 28 engages the ratchet plates 27 and holds the reel 24 against rotation in belt protraction direction.

The disadvantage of having a vehicle sensitive inertia retractor mechanism mounted in the vehicle door is that if the door is jerked or shoved rapidly in an opening direction or in a closing direction, as the case may be, the inertia of the pendulum could result in a lock-up of the reel. If this occurs when the seat belt 13 is in seat occupant restraining position, the belt cannot protract to permit opening movement of the door and egress of the seat occupant from beneath the belt. If the reel is locked up when the door is open and the belt is extended, retraction of the belt then would be inhibited. Because of the slack in the belt, it could be caught in the door opening as the door swings shut, or it could fail to properly embrace the torso of the seat occupant.

To prevent the locking of the reel as the door is moved between opened and closed position, the present invention proposes the addition of pendulum movement inhibiting means. The pendulum movement inhibiting means comprises an electromagnet 36 that is mounted in the support frame in close proximity to the pendulum 31. Mounted on the underside of the locking bar 28 is a leaf spring 37 that extends almost from the edge 38 of the locking bar to the electromagnet 36. When the electromagnet is energized, the spring end 39 will be attracted to the magnet and held thereagainst until the magnet is deenergized. The locking bar 28 thus effectively would be held out ratchet plate engagement.

As schematically shown in FIG. 1, current to the electromagnet 36 may be controlled by either one of two switches 41 or 42 adapted to close a circuit from the battery terminal 43 through the electromagnet to the ground connections 44. Switch 41 may be activated by the inside door handle that causes release of the door latch mechanism 45. Switch 42 is activated when the latch elements of the door latch mechanism move into unlatched position. The electromagnet remains energized as long as the latch elements signal the door is in unlatched position.

The holding power of the electromagnet is selected such that movement of the pendulum 31 is inhibited at the relatively low accelerations that occur as the door is opened or closed, low, that is, when compared to the accelerations encountered under vehicle accident conditions. If the system should fail, however, such that the electromagnet is energized while the door is closed, high acceleration of the pendulum would force the locking bar up into reel locking position. This would occur either through disengagement of the leaf spring end 39 from the magnet of the electromagnet or upward flexing of the leaf spring 37 so that the locking bar 28 would be forced to engage the ratchet plate teeth 29.

It is to be understood that this invention is not limited to the exact construction illustrated and described above, but that various changes and modifications may be made without departing from the spirit and scope of the invention as defined in the appended claims.

We claim:

1. A seat belt retractor mechanism having a seat belt reel rotatably journalled in a support frame mounted within a door of a vehicle;

the reel having at least at one of its ends a circular ratchet plate;

a locking bar means pivotally mounted on the support frame for movement into ratchet plate engagement to hold the reel against rotation in seat belt protraction direction;

an inertia sensor means comprising a pendulum device engageable with the locking bar means for driving the latter into ratchet plate engagement upon rapid acceleration or deceleration of the vehicle;

the pendulum device being mounted on the support frame in position to act directly on the locking bar to pivot the latter into ratchet plate engagement;

and electromagnet means mounted on the support frame in offset relation to the pendulum device and in abutting relation to a biasing means coupled to the locking bar;

the biasing means being magnetically gripped by the electromagnet means upon energization of the latter to resist movement of the locking bar into ratchet plate engagement by the pendulum device until the acceleration or deceleration forces acting on the pendulum device exceed a magnitude above that resulting from normal swinging closure or opening of the door thereby causing flexure of the biasing means in a direction to permit the locking bar to engage the ratchet plate;

a source of current for energizing the electromagnet means;

and switch means responsive to a predetermined condition of a vehicle component for controlling current to the electromagnet means.

2. A seat belt retractor mechanism according to claim 1, in which:

the switch means for controlling current to the electromagnet means senses the unlatched or latched condition of a door latch mechanism in the door; the electromagnet means being energized when the latch mechanism is in unlatched condition and deenergized in latched condition.

3. A seat belt retractor mechanism according to claim 1, in which:

the switch means for controlling current to the electromagnet means is movable into electromagnet energization position upon operation of a handle for releasing a latch mechanism to permit opening movement of the vehicle door.

4. A seat belt retractor mechanism according to claim 1, in which:

the biasing means comprises an elongated spring having one end secured to the locking bar near the pivot axis of the latter and its other end overlying the armature of the electromagnet means;

the flexure of the biasing means occurring between the spring ends.

* * * * *